United States Patent

Graniaris

[11] 3,827,248
[45] Aug. 6, 1974

[54] ICE CRYSTALS
[75] Inventor: Neophytos Graniaris, Riverdale, N.Y.
[73] Assignee: Struthers Patent Corporation, Houston, Tex.
[22] Filed: Apr. 30, 1973
[21] Appl. No.: 355,690

[30] Foreign Application Priority Data
May 1, 1972    Great Britain .................... 20157/72

[52] U.S. Cl. ................................................ 62/123
[51] Int. Cl. ............................................ B01d 9/04
[58] Field of Search ..................... 62/58, 123, 124

[56] References Cited
UNITED STATES PATENTS
3,019,611    2/1962    Toulmin, Jr. ..................... 62/123 X
3,069,864   12/1962    Crosby ................................. 62/58

Primary Examiner—Meyer Perlin
Assistant Examiner—Ronald C. Capossela
Attorney, Agent, or Firm—William Anthony Drucker

[57] ABSTRACT

Ice crystals formed in a solution, such as in the ice crystallization conversion of seal water to fresh water, or slush freezing of citrus juice, coffee or tea, are washed in liquid butane at a temperature below 32° F. The crystals rest on an inclined screen sinking down in the butane and they are agitated mechanically by butane jets and/or by vibration of the screen. Brine, which is mechanically washed from the crystals, sinks through the screen to be collected below it. Washed ice crystals move down the screen to be collected, melted and debutanized.

9 Claims, 2 Drawing Figures

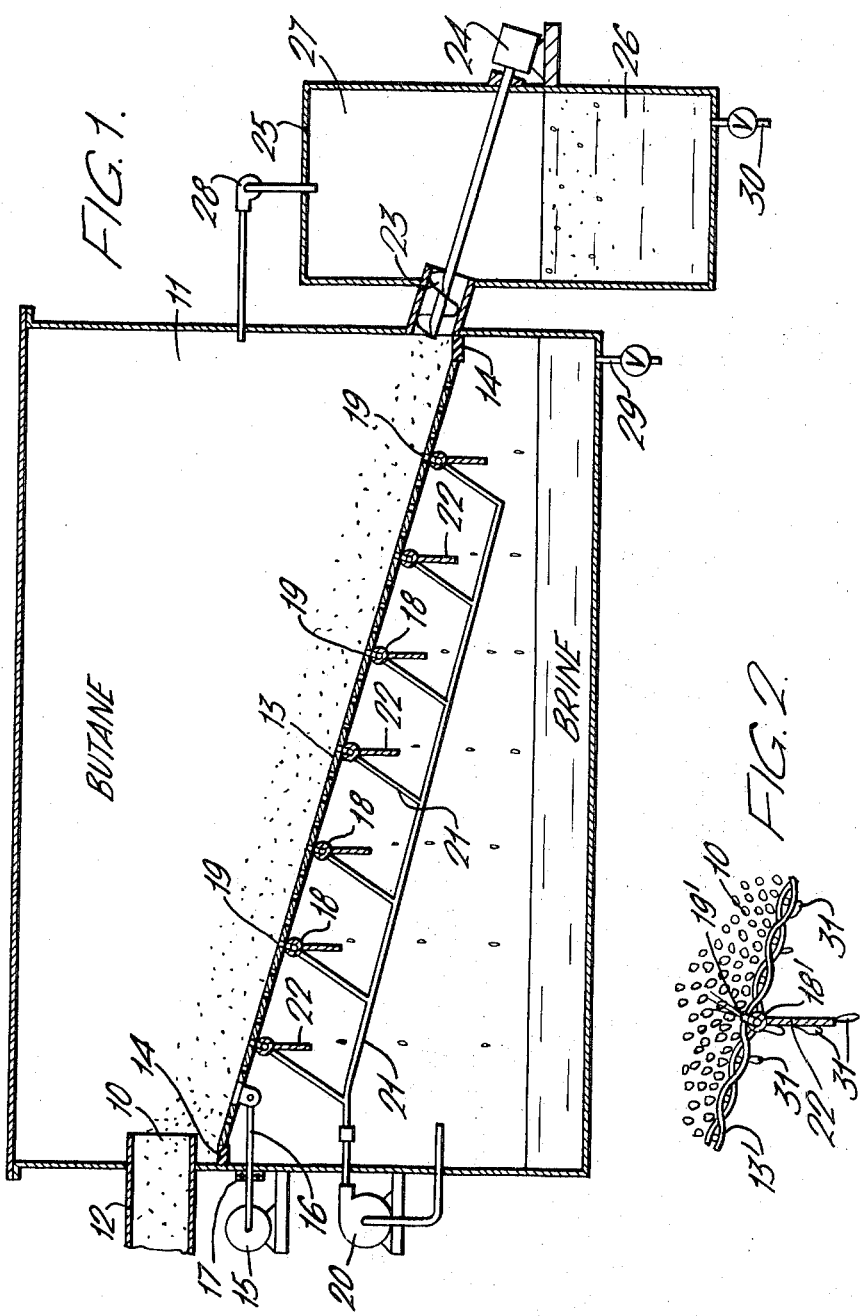

ICE CRYSTALS

BACKGROUND OF THE INVENTION

Ice crystals formed in solution, as in the freeze conversion of sea water into fresh water, are conventionally washed by fresh water using a number of different methods. Ice crystals may be centrifuged and sprayed with fresh water, they may be spread on screens and sprayed, and other spray techniques may be used. Wash columns may be used which float ice crystals or otherwise move them through fresh water to remove brine from them. Water may be forced through caked ice crystals, for the same purpose. All these water wash methods require fresh wash water which amounts to 5 to 15 per cent by weight of the ice crystals recovered under the best circumstances. In addition, a considerable weight of the brine coated ice crystals may be melted during their water washing as the wash water must be over 32° F. The butane washing of ice crystals according to this invention is more efficient and economical.

BRIEF DESCRIPTION OF THE DRAWING

FIG. 1 is a longitudinal, vertical section through a wash tank and a crystal melting and debutanizing tank according to this invention; and FIG. 2 is a section through a fragment of woven screen with ice crystals thereon.

DESCRIPTION OF THE PREFERRED EMBODIMENTS

As shown in FIG. 1, a brine and ice slurry 10 enters tank 11 through duct 12 propelled by any suitable conveyor (not shown). Tank 11 is rectangular and contains a downward sloping screen 13 which may be a sheet of perforated metal. Screen 13 is mounted in a resilient frame 14 of rubber or the like so that the vibrator 15 may be connected to it by means of the push rod 16 which enters the tank 11 through a seal 17.

Transverse tubes 18 containing upward facing jets 19 are fixed to the bottom of screen 13. Pump 20 draws butane from tank 11 and passes it through flexible tubes 21 to each transverse tube 18. Transverse drip baffles 22 extend down from each tube 18 or from the bottom of screen 13. The screen 13, tubes 18, and baffles 22 may be of metal welded together. Tubes 21 may be of vinyl or other flexible material. A screw 23 or the like driven by motor 24 draws washed ice crystals into the melt and butane separation tank 25.

This apparatus is used in the following manner. Ice crystals 10 fall on the screen 13 which is agitated by vibrator 15 in its resilient frame 14. The mechanical agitation of the crystals in liquid butane removes brine from their surfaces. This removed brine and any other brine introduced with the crystals sinks through screen 13 to drip from it and collect in the bottom of tank 11. The agitation of the ice crystals on screen 13 may alternately be accomplished by jets 19 of butane pumped up through screen 13 by pump 20 through the tubes 21 and 18. If desired both forms of mechanical agitation may be used together. The liquid butane in tank 11 is best kept above the freezing temperature of the brine which is usually about 26° to 27° F. in the freeze crystallization of sea water and below the 32° F. melting temperature of the ice crystals. Tanks 11 and 25 are pressurized to enable the butane to be liquid at the desired operating temperatures. During the washing of the ice crystals on screen 13, some surface ice will melt on each crystal to achieve equilibrium, but the ice lost during butane washing will be minimal compared to the conventional water washing.

Washed crystals 10 at the lower end of screen 13 are removed by screw conveyor 23 into tank 25. Any conventional means, such as heat exchanger coils (not shown) are used to melt ice to water 26 which separates from any liquid butane 27 carried into tank 25 on the crystals. Pump 28 is automatically controlled to return separated butane to tank 11. Brine is drawn off through pipe 29 and fresh water as a product through pipe 30. Further debutanizing may be carried out in the brine and the fresh water product if required.

FIG. 2 shows a mesh screen 13' on which are disposed crystals 10. A tube 18' has jets 19' through which butane is pumped to agitate the crystals and wash them. A drip baffle 22' is fixed to the bottom of tube 18' to prevent drops of brine 31 in the butane from running down the inclined screen 13'. The mesh size shown in FIG. 2 for screen 13' is greatly exaggerated.

In summary, the process of this invention mechanically washes brine covered ice crystals in liquid butane held at a temperature below the freezing point of the crystals. This more effectively removes adhering brine with less crystal melting and with no use of fresh wash water.

This invention applies to ice in coffee, tea and citrus juice and to other organic liquids than butane, such as propanes, pentanes, hexanes.

What is claimed is:

1. Apparatus for washing ice crystals comprising, in combination,
   a. a wash tank containing an organic liquid less dense than water selected from the group consisting of butane, propane, pentane and hexane,
   b. an inclined screen in said tank,
   c. means introducing ice crystals to be washed above an upper portion of said screen,
   d. means agitating the ice crystals sinking downward in the organic liquid against said screen working the ice crystals downward on the screen to a lower portion of said screen, the agitation of the ice crystals washing solute therefrom to pass downward through said screen and settle in the bottom of said tank,
   e. means removing washed ice crystals from above the lower portion of said screen, and
   f. means removing solute from the bottom of said tank.

2. The combination according to claim 1 wherein said organic liquid is butane.

3. The combination according to claim 2 wherein said ice crystals have washed therefrom a solute of comestibles.

4. The combination according to claim 2 wherein said ice crystals are in a slurry of brine, brine being washed from said ice crystals.

5. The combination according to claim 2 with the addition of transverse drip baffles extending downward from said screen.

6. The combination according to claim 2 wherein said screen is resiliently mounted and wherein said means agitating ice crystals is a vibrator connected to said screen vibrating said screen and thereby agitating said ice crystals.

7. The combination according to claim 2 wherein said tank is filled with butane below 32° F.

8. The combination according to claim 2 wherein said means agitating said ice crystals comprises means directing jets of butane upward above said screen to agitate ice crystals thereon.

9. The combination according to claim 7 wherein said screen is resiliently mounted and with the addition of a vibrator connected to said screen vibrating said screen to additionally agitate said ice crystals.

* * * * *